United States Patent
Meisser et al.

(10) Patent No.: US 7,685,964 B2
(45) Date of Patent: Mar. 30, 2010

(54) DEVICE FOR WETTING CABLE-ENDS

(75) Inventors: Claudio Meisser, Cham (CH); Georges Britschgi, Alpnach Dorf (CH)

(73) Assignee: Komax AG, Dierikon (CH)

( * ) Notice: Subject to any disclaimer, the term of this patent is extended or adjusted under 35 U.S.C. 154(b) by 237 days.

(21) Appl. No.: 10/868,617

(22) Filed: Jun. 15, 2004

(65) Prior Publication Data

US 2005/0000421 A1     Jan. 6, 2005

(30) Foreign Application Priority Data

Jul. 3, 2003     (EP)  .................................. 03405496

(51) Int. Cl.
*B05C 3/12*     (2006.01)

(52) U.S. Cl. ........................ 118/420; 118/429; 118/410; 118/325

(58) Field of Classification Search ................. 118/429, 118/410, 420, 325; 417/360; 366/266, 281–284; 248/167, 139–142

See application file for complete search history.

(56) References Cited

U.S. PATENT DOCUMENTS

| | | | | |
|---|---|---|---|---|
| 2,625,720 | A * | 1/1953 | Ross ........................... | 222/318 |
| 2,742,203 | A * | 4/1956 | Ethier ......................... | 222/575 |
| 2,864,652 | A * | 12/1958 | O'Brien et al. ............. | 239/523 |
| 3,765,591 | A | 10/1973 | Cook | |
| 3,896,763 | A * | 7/1975 | Lau et al. ...................... | 118/50 |
| 4,011,980 | A | 3/1977 | Dvorak et al. | |
| 4,071,179 | A * | 1/1978 | Antonevich ................. | 228/56.2 |
| 4,375,674 | A * | 3/1983 | Thornton ..................... | 702/41 |
| 4,873,938 | A | 10/1989 | Ciniglio | |
| 4,975,184 | A * | 12/1990 | McEwen ..................... | 210/136 |
| 5,030,346 | A * | 7/1991 | McEwen ..................... | 210/258 |
| 5,135,364 | A * | 8/1992 | McEwen ..................... | 417/360 |
| 6,134,940 | A * | 10/2000 | Banks et al. ................. | 72/476 |
| 6,695,923 | B1 * | 2/2004 | Schultz et al. .............. | 118/679 |
| 6,911,142 | B2 * | 6/2005 | Pahl et al. .................... | 210/167 |

FOREIGN PATENT DOCUMENTS

DE     28 44 236     8/1979

* cited by examiner

*Primary Examiner*—Brenda A Lamb
(74) *Attorney, Agent, or Firm*—Fraser Clemens Martin & Miller LLC; William J. Clemens

(57) ABSTRACT

A device for wetting cable-ends includes a stand supporting a control, a bath-container with a bath, and a conveyor unit for conveying to the cable-end a wetting agent which forms the bath. The conveyor unit has a drive, a pump unit, a conveyor-pipe, and a nozzle with throttle. The pump unit conveys the wetting agent through the conveyor pipe to the nozzle with the wetting agent flowing through an exchangeable throttle that determines the shape and size of the free jet of the wetting agent.

16 Claims, 4 Drawing Sheets

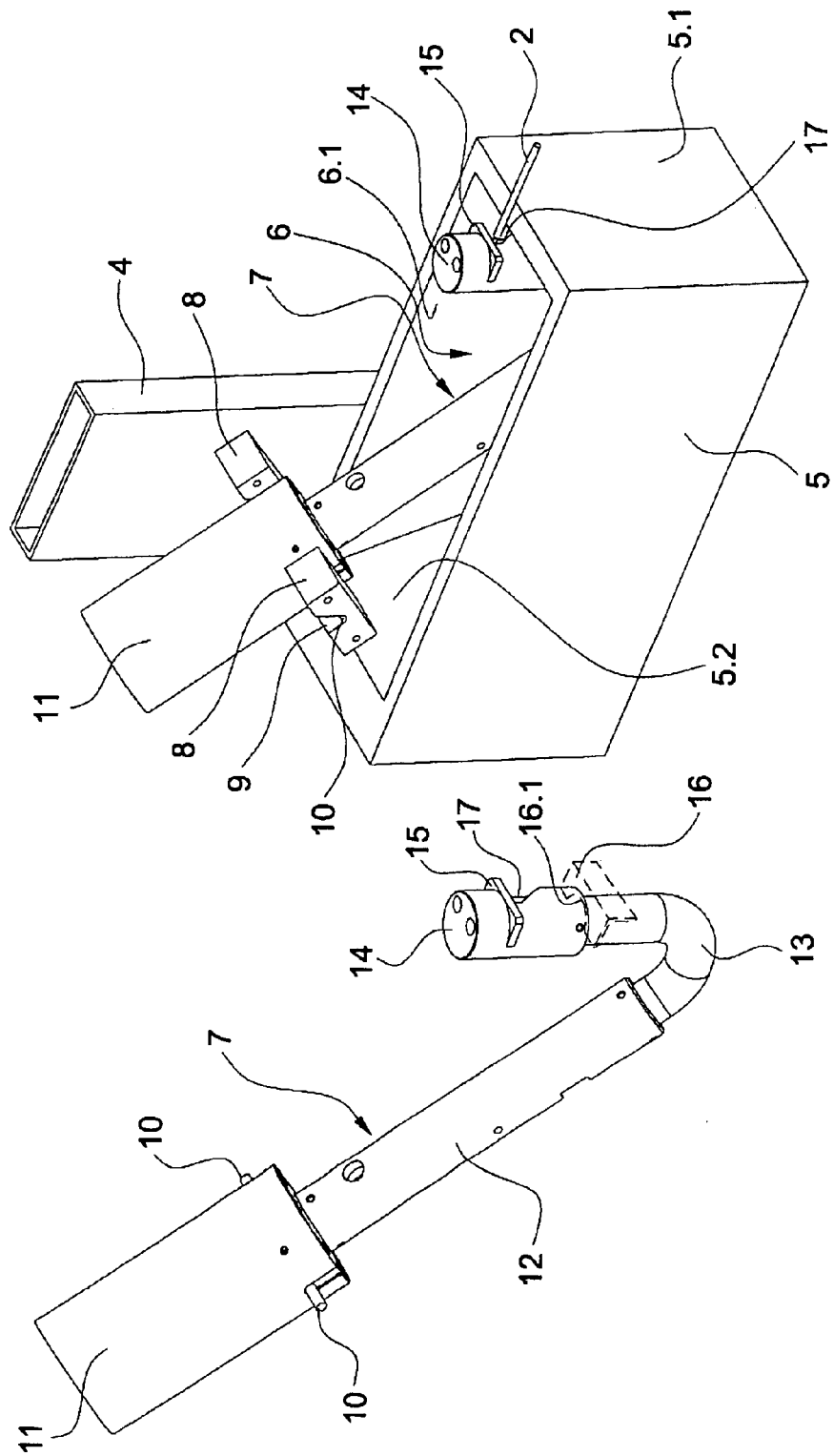

DEVICE FOR WETTING CABLE-ENDS

BACKGROUND OF THE INVENTION

The present invention relates to a device for wetting cable-ends consisting of a conveying unit arranged on a stand and a bath-container with a wetting agent, the conveyer unit conveying the wetting agent stored in the bath-container to the cable-end.

German patent application DE 28 44 236 shows a tin-bath with solder-wave overflow with stripped ends of conductors being tinned in the overflowing solder-wave. By means of a pump, liquid tin is pushed upwards in a column to above the surface of the bath. At the end of the column a nozzle is arranged through which the tin overflows and creates the solder wave. The overflowing tin returns to the bath. Grasped by means of grippers, stripped cable-ends are dipped into the solder-wave, the strands of the cable are heated by the tin, and the tin wets the cable-strands and permeates the cable-strands.

A disadvantage of this known device is that the column is immovably fastened to the bath-container. This hinders cleaning of the surface of the tin-bath, or surface of the bath.

SUMMARY OF THE INVENTION

The present invention concerns a device for wetting cable-ends of cables comprising: a conveyor unit mounted on a stand; and a bath-container for retaining a bath of a wetting agent, the conveyer unit extending into the bath-container for conveying the wetting agent stored in the bath-container to a cable-end, whereby the conveyor unit is removably mounted for installation in and removal from the bath-container without the use of tools. The conveyor unit is mounted on at least one support arranged on the stand and on a rest arranged on a front wall of the bath-container, the conveyor unit having at least one supporting pin engaging an opening of the at least one support. The conveyor unit includes a drive, a pump unit operated by the drive, a conveyor pipe connected to an outlet of the pump unit and a nozzle connected to an outlet of the conveyor pipe, whereby when the wetting agent is stored in the bath-container, the drive operates the pump unit to cause the wetting agent to flow from the bath-container through the conveyor pipe and out the nozzle.

The pump unit has a pump-screw for conveying the wetting agent from the bath-container through the conveyor pipe to the nozzle. The nozzle has an exchangeable throttle with an aperture forming a free jet of the wetting agent of predetermined size and shape and at least one lateral drain for draining off a surplus of the wetting agent. The bath-container has at least one downward sloping heatable wall for contacting the wetting agent.

The advantages achieved by the present invention are mainly to be seen in that the parts which are needed to convey the agent for wetting the cable-ends are easy to install and remove. Conveyer pipe, pump, nozzle, and drive form one unit which can be installed in, and removed from, the bath-container without tools. Moreover, the surplus wetting agent is drained off to the side of the nozzle and led back into the bath. The nozzle can therefore be arranged nearer to the front wall of the bath-container with the result that shorter lengths of cable can be subjected to the wetting process. To heat the bath and maintain the temperature of the bath, the bath-container is usually provided with heating from underneath. The bath is heated from the bottom upwards, in consequence of which explosion-like bubbling can occur on the surface of the bath. With the device according to the present invention, the unpredictably occurring bubbles can be avoided. For this purpose the bath-container has at least one sloping heatable wall which rises up from the bottom of the container.

DESCRIPTION OF THE DRAWINGS

The above, as well as other advantages of the present invention, will become readily apparent to those skilled in the art from the following detailed description of a preferred embodiment when considered in the light of the accompanying drawings in which:

FIG. 2 is a perspective view of the bath-container and the conveying unit for conveying a wetting agent shown in FIG. 1;

FIG. 3 is a perspective view of the conveying unit shown in FIG. 2;

DESCRIPTION OF THE PREFERRED EMBODIMENT

Figure 1:
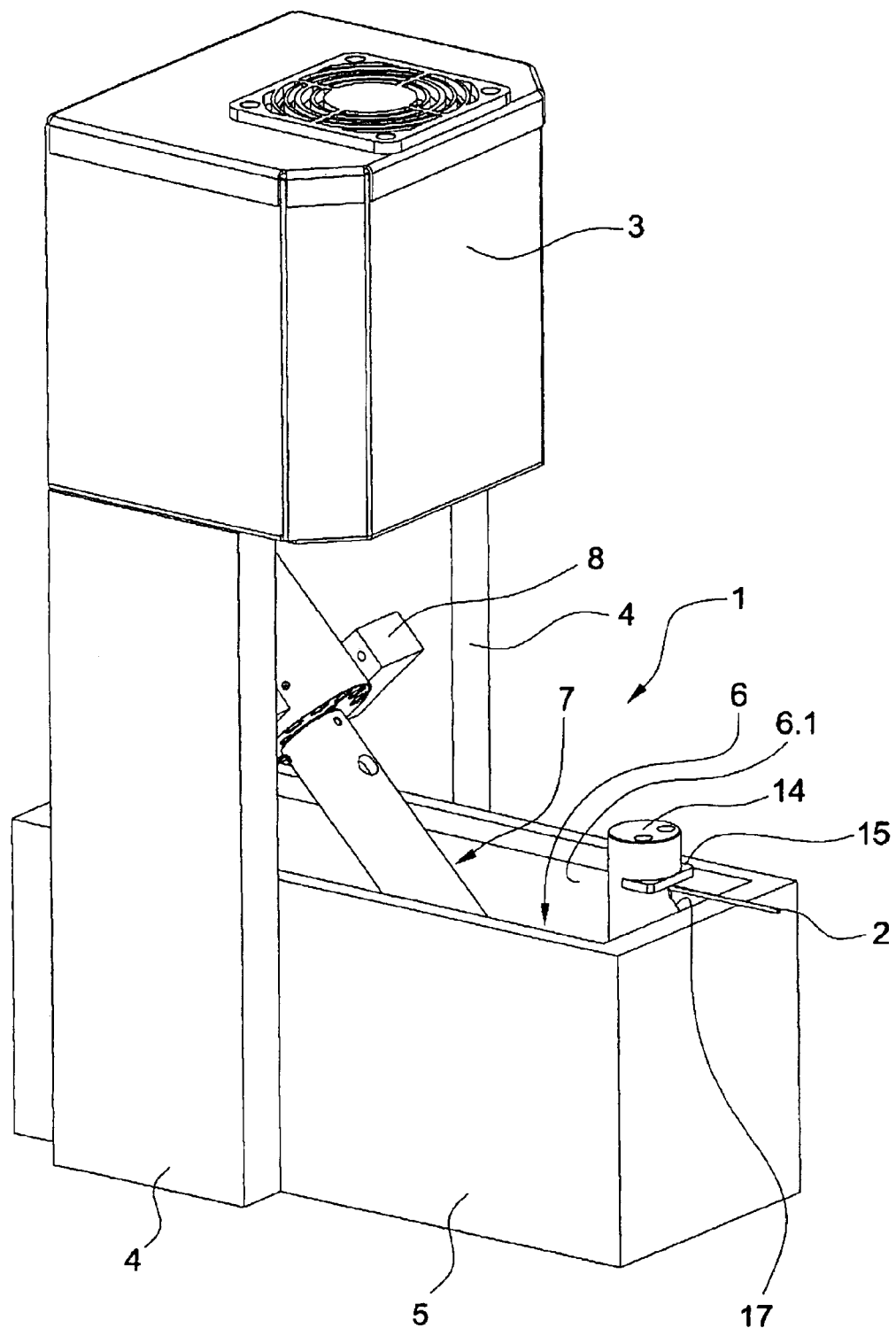
FIG. 1 is a perspective schematic view of a device according to the present invention for wetting cable-ends.

FIG. 1 shows a device 1 according to the present invention for wetting metal cable-ends such as a cable-end 2. The device 1 consists of a stand 4 bearing a control 3, a bath-container 5 having a cavity with a bath 6, and a conveyer unit 7 for conveying to the cable-end 2 a wetting agent which forms the bath 6. The surface of the bath is indicated with the reference numeral 6.1. As a wetting agent, soldering tin (with or without lead), for example, can be used. The use of other wetting agents is also conceivable.

FIG. 2 shows the bath-container 5 and the conveyor unit 7 for conveying the wetting agent in more detail. The conveyor unit 7 is borne on supports 8 arranged on the stand 4. Each of the supports 8 is provided with a V-shaped opening 9 into which a supporting pin 10 of the conveyor unit fits.

FIG. 3 shows the conveyor unit 7 comprising a drive 11, a pump unit 12, a conveyor pipe 13, and a nozzle 14 with a throttle 15. The conveyor unit 7 is carried on the two supporting pins 10 and on an angle-shaped rest 16 with a circular opening 16.1. The rest 16 is arranged on the inside of a front wall 5.1 (FIG. 2) of the bath-container 5 and positions the nozzle centrally and in height. By means of the support 8 the supporting pins 10 and the rest 16, the conveyor unit 7 can be installed in, and removed from, the bath-container 5 without tools.

Figure 4:
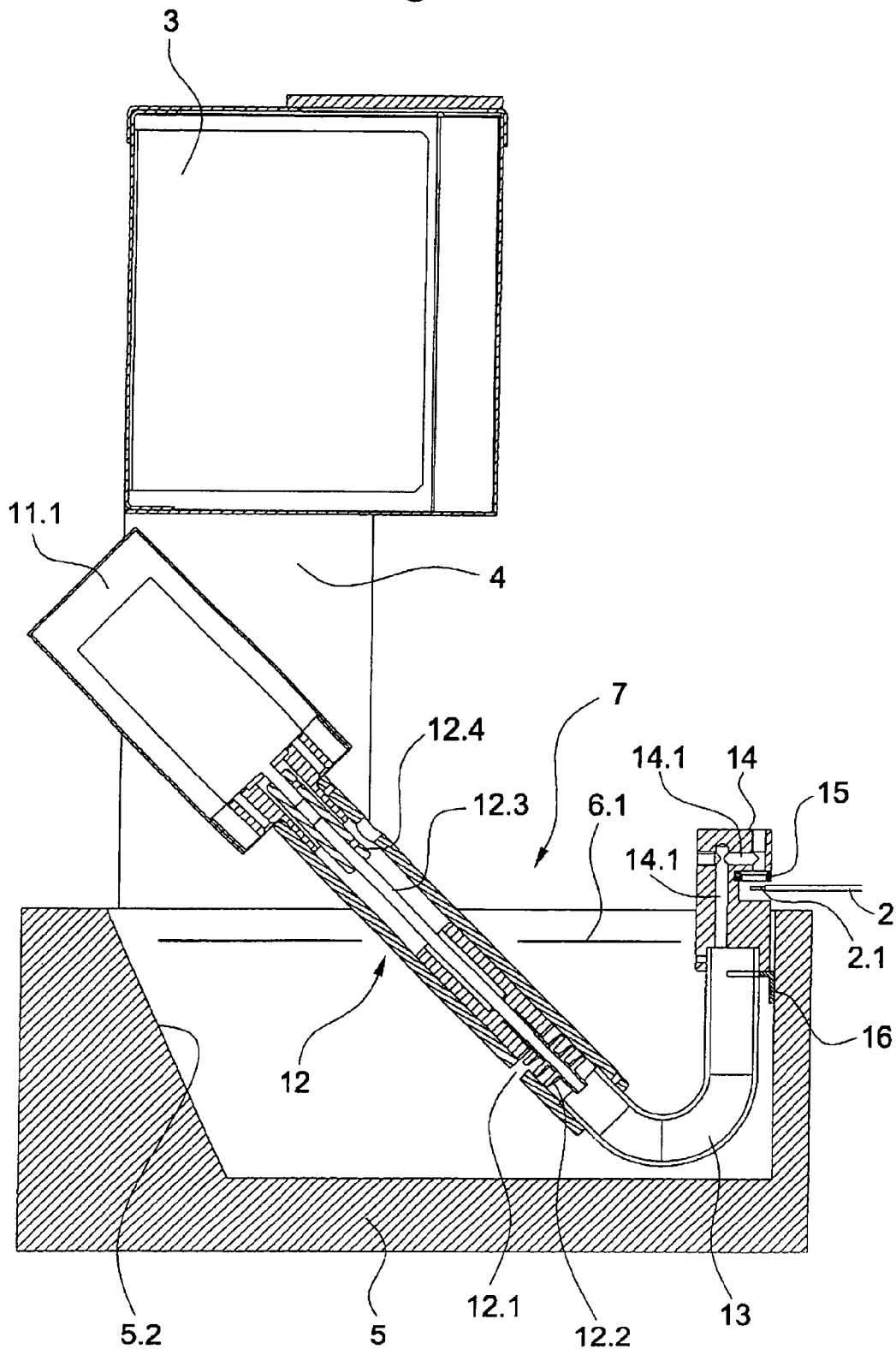
FIG. 4 is a vertical cross-section through the conveying unit and the bath-container shown in FIG. 1.

FIG. 4 shows a longitudinal cross-section through the conveyor unit 7 and the bath-container 5. The bath-container 5 is provided with a downward sloping rear wall 5.2 which is heatable. By this means, the bath 6 is heated not only from below upwards but also at least partially at the surface. At least one side wall of the bath-container 5 can also be heatable and downward sloping.

The pump unit 12 is provided with an inlet 12.1 through which the wetting agent reaches an internal pump-screw 12.2. The pump-screw 12.2 is driven by means of a shaft 12.3 which is connected to, and thermally isolated (connector 12.4) from, a drive motor 11.1. The pump-screw 12.2 conveys the wetting agent through the conveyor pipe 13 to the nozzle 14, the wetting agent flowing through drilled holes 14.1 to the exchangeable throttle 15 which determines the form and size of the free jet of the wetting agent. A stripped cable-end 2.1 is brought into the free jet of the wetting agent, the cable conductor or cable strands being heated by the wetting agent, and the wetting agent wetting the cable conductor or cable strands and/or permeating the cable strands. If soldering tin is used as wetting agent, the cable conductor consisting of, for example, copper, is, or the strands consisting of, for example, copper are, tinned. The surplus wetting agent flows down at the side of the nozzle 14 and back into the bath-container 5. Feeding of the stripped cable-ends 2.1 can take place manually or automatically by means of grippers (not shown).

Figure 5:
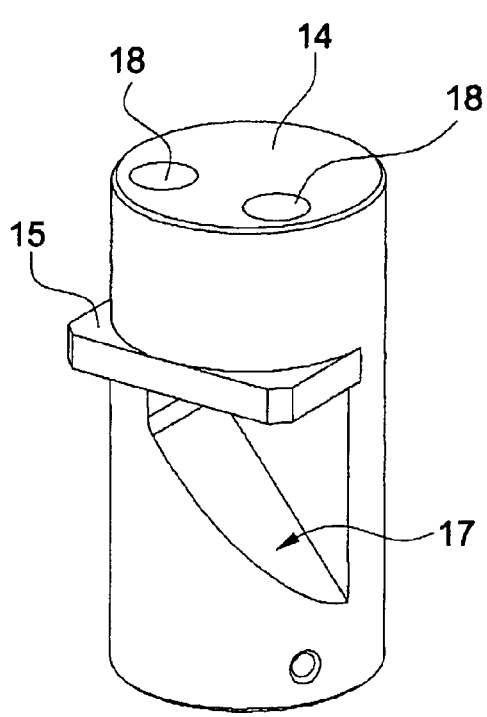
FIGS. 5 and 6 are enlarged perspective views of two embodiments of the nozzle of the conveying unit shown in FIG. 3.
Figure 6:
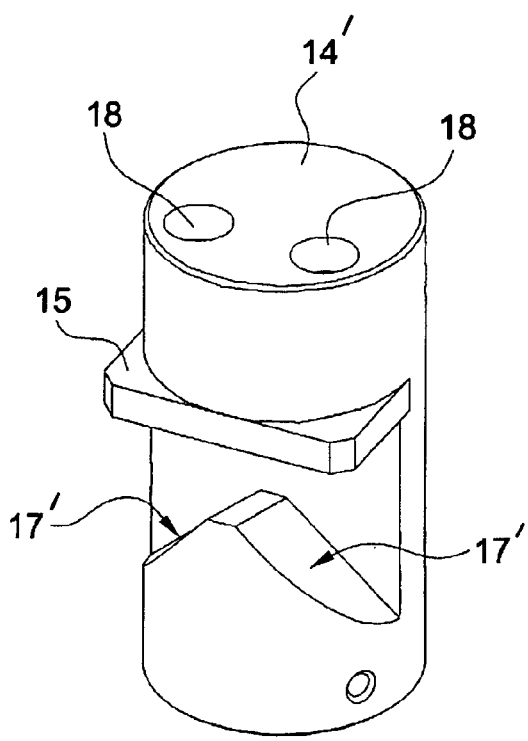

FIGS. 5 and FIG. 6 show details of the nozzle 14. FIG. 5 shows the nozzle 14 with a lateral drain 17 and FIG. 6 shows an alternate embodiment nozzle 14' with two lateral drains 17'. The drain 17 (17') is formed by a cutout in the cylindrical nozzle 14 (14') below the throttle 15. In the case of the nozzle 14 according to FIG. 5, the cable-end 2 is fed to the free jet of wetting agent with a linear movement in a plane generally parallel to a bottom surface of the throttle 15. In the case of the nozzle 14' according to FIG. 6, the cable-end 2 can be fed to the free jet of the wetting agent with a swiveling movement in a plane generally parallel to a bottom surface of the throttle 15.

Figure 7:
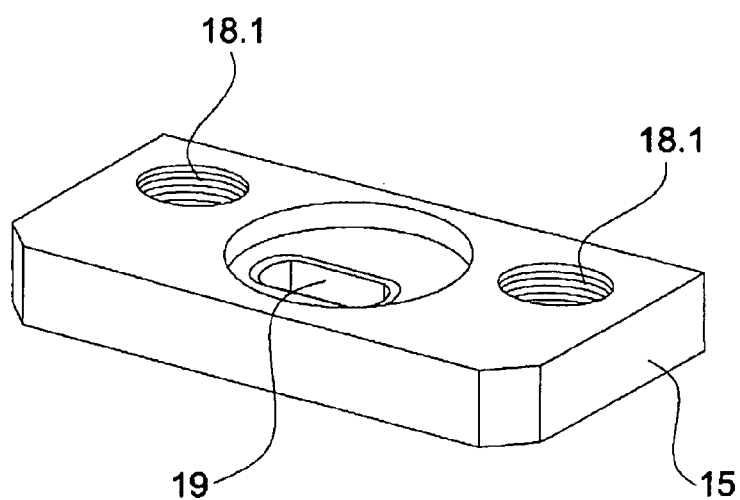
FIG. 7 is an enlarged perspective view of the throttle of the nozzles shown in FIGS. 5 and 6.

FIG. 7 shows details of the throttle 15, which is separably fastened to the nozzle 14 (14') by means of screws 18 (FIGS. 5 and 6) which fit into threaded holes 18.1 of the throttle 15. The throttle 15 is provided with a drilled hole 19 through which the wetting agent flows. The size and shape of the drilled hole 19 can vary depending on the desired free jet.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A device for wetting cable-ends of cables comprising:
a conveyor unit mounted on a stand, said conveyor unit including a drive, a pump unit operated by said drive, a conveyor pipe connected to an outlet of said pump unit and a nozzle connected to an outlet of said conveyor pipe; and
a bath-container for retaining a bath of a wetting agent, said conveyer unit extending into said bath-container for conveying the wetting agent stored in the bath-container to a cable-end, whereby said conveyor unit is removably mounted for installation in and removal from said bath-container, and when the wetting agent is stored in said bath-container, said drive operates said pump unit to cause the wetting agent to flow from the bath-container through said conveyor pipe and out said nozzle and wherein said nozzle has a cutout opening in a sidewall of the nozzle defining a chamber, an exchangeable throttle plate arranged within the chamber, said exchangeable throttle plate having an aperture forming a free jet of the wetting agent of predetermined size and shape to coat cable-ends of a cable which is positionable within a remaining space of the chamber which oppositely faces and is below said throttle plate, said throttle plate being removable from said nozzle without removing said nozzle from said conveyor pipe.

2. The device according to claim 1 wherein said conveyor unit is mounted on at least one support arranged on said stand and on a rest arranged on a front wall of said bath-container, said conveyor unit having at least one supporting pin engaging an opening of said at least one support.

3. The device according to claim 1 wherein said pump unit has a pump-screw for conveying the wetting agent from said bath-container through said conveyor pipe to said nozzle.

4. The device according to claim 1 wherein said bath-container has at least one downward sloping heatable wall for contacting the wetting agent.

5. A device for wetting cable-ends of cables comprising:
a conveyor unit mounted on a stand, said conveyor unit including a drive, a pump unit operated by said drive, a conveyor pipe connected to an outlet of said pump unit and a nozzle connected to an outlet of said conveyor pipe; and
a bath-container for retaining a bath of a wetting agent, said conveyer unit extending into said bath-container for conveying the wetting agent stored in the bath-container to a cable-end, whereby said conveyor unit is removably mounted for installation in and removal from said bath-container, and when the wetting agent is stored in said bath-container, said drive operates said pump unit to cause the wetting agent to flow from the bath-container through said conveyor pipe and out said nozzle and wherein said nozzle has an exchangeable throttle with an aperture forming a free jet of the wetting agent of predetermined size and shape, said throttle being removable from said nozzle without removing said nozzle from said conveyor pipe, wherein said nozzle has at least one lateral drain for draining off a surplus of the wetting agent.

6. The device according to claim 5 wherein said nozzle has two lateral drains for draining off a surplus of the wetting agent, said lateral drains extending in opposite directions.

7. A device for wetting cable-ends of cables comprising:
a stand;
a conveyor unit removably mounted on said stand; and
a bath-container having a cavity for retaining a bath of a wetting agent, said stand being positioned entirely outside said bath-container and not extending over the cavity of said bath-container, and said conveyer unit extending into said bath-container cavity for conveying the welling agent stored in the bath-container to a cable-end, whereby said conveyor unit is removable from said stand for installation in and removal from said bath-container and wherein said conveyor unit is mounted on a pair of supports arranged on said stand and on a rest arranged on a front wall of said bath-container, said conveyor unit having a pair of supporting pins each engaging an opening of a respective one of said supports, and wherein said conveyor unit is positioned to permit surplus of the wetting agent to flow from an area of the cable-end back into said bath-container.

8. The device according to claim 7 wherein said conveyor unit includes a drive, a pump unit operated by said drive, a conveyor pipe connected to an outlet of said pump unit and a nozzle connected to an outlet of said conveyor pipe, whereby when the wetting agent is stored in said bath-container, said drive operates said pump unit to cause the wetting agent to flow from the bath-container through said conveyor pipe and out said nozzle.

9. The device according to claim 8 wherein said pump unit has a pump-screw for conveying the wetting agent from said bath-container through said conveyor pipe to the nozzle.

10. The device according to claim 8 wherein said nozzle has an exchangeable throttle with an aperture forming a free jet of the wetting agent of predetermined size and shape.

11. The device according to claim 8 wherein said nozzle has at least one lateral drain for draining off a surplus of the wetting agent.

12. The device according to claim 8 wherein said nozzle has two lateral drains for draining off a surplus of the wetting agent, said lateral drains extending in opposite directions.

13. The device according to claim 7 wherein said bath-container has at least one downward sloping heatable wall for contacting the wetting agent.

14. A device for wetting cable-ends of cables comprising:
a stand;
a conveyor unit removably mounted on said stand; and
a bath-container having a cavity for retaining a bath of a wetting agent, said stand being positioned entirely outside said bath-container and not extending over the cavity of said bath-container, and said conveyer unit extending into said bath-container cavity for conveying the wetting agent stored in the bath-container to a cable-end, and wherein said conveyor unit is mounted on a pair of supports arranged on said stand and on a rest arranged on a front wall of said bath-container, said conveyor unit having a pair of supporting pins each engaging an opening of a respective one of said supports whereby said conveyor unit including said pins is removable from said stand for installation in and removal from said bath-container.

15. The device according to claim 14 wherein said stand includes a pair of vertically extending legs and an associated one of said supports is arranged on each of said legs.

16. The device according to claim 15 including a control mounted on said pair of legs.

* * * * *